United States Patent
Sekine

(10) Patent No.: US 11,972,513 B2
(45) Date of Patent: Apr. 30, 2024

(54) PRESENTATION MANAGEMENT SYSTEM

(71) Applicant: INTERACTIVE SOLUTIONS CORP., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 0 days.

(21) Appl. No.: 17/607,415

(22) PCT Filed: Feb. 13, 2020

(86) PCT No.: PCT/JP2020/005537
§ 371 (c)(1),
(2) Date: Oct. 29, 2021

(87) PCT Pub. No.: WO2020/261633
PCT Pub. Date: Dec. 30, 2020

(65) Prior Publication Data
US 2022/0222877 A1    Jul. 14, 2022

(30) Foreign Application Priority Data

Jun. 24, 2019 (JP) .................. 2019-116740

(51) Int. Cl.
*G06T 11/60* (2006.01)
*G06F 3/04817* (2022.01)

(52) U.S. Cl.
CPC .......... *G06T 11/60* (2013.01); *G06F 3/04817* (2013.01)

(58) Field of Classification Search
CPC .... G06T 11/60; G06F 3/04817; G06F 3/0483; G06F 3/0484; G06F 16/4393
See application file for complete search history.

(56) References Cited

U.S. PATENT DOCUMENTS 9,261,766 B1 * 2/2016 Krishnan ............... G03B 21/26
2003/0222890 A1 * 12/2003 Salesin .................. G06F 16/48
345/629

(Continued)

FOREIGN PATENT DOCUMENTS

CN    102119377 A    7/2011
JP    H05-158778 A    6/1993

(Continued)

OTHER PUBLICATIONS

Office Action of Chinese Patent Application No. 202080037994.8 dated Mar. 3, 2022 (7 pages).

(Continued)

*Primary Examiner* — Daniel Samwel
(74) *Attorney, Agent, or Firm* — Pyprus Pte Ltd; George D. Liu

(57) ABSTRACT

The purpose of the present invention is to allow one to set necessary slides or a group of slides with an order that cannot be changed when using certain presentation material. Furthermore, the invention provides a system which allows such necessary slides or group of slides to be easily viewed when using such presentation material. Provided is a presentation management system 1 for managing a presentation, said system comprising a slide storage means 3 for storing a plurality of slides relating to the presentation and a group slide information appending means 11 for appending group slide information to a slide group of any two or more slides of the plurality of slides 5 stored in the slide storage means 3, said group slide information relating to the matter of the slide group being one group of slides 7 having a fixed display order, wherein the one group of slides 7 to which the group slide information is appended is placed in a state in which the display order cannot be changed and only a (Continued)

portion of the slides included in the one group of slides cannot be deleted.

7 Claims, 6 Drawing Sheets

(56) References Cited

U.S. PATENT DOCUMENTS

| | | | | |
|---|---|---|---|---|
| 2005/0108619 | A1* | 5/2005 | Theall | G06F 16/48 |
| | | | | 715/255 |
| 2007/0124681 | A1* | 5/2007 | Abbar | G06F 9/451 |
| | | | | 715/730 |
| 2007/0260683 | A1* | 11/2007 | Hintermeister | H04L 12/1827 |
| | | | | 709/204 |
| 2013/0109426 | A1* | 5/2013 | Kerger | H04M 1/72463 |
| | | | | 455/518 |
| 2014/0317759 | A1* | 10/2014 | Lee | G06F 3/0483 |
| | | | | 726/28 |
| 2015/0253941 | A1 | 9/2015 | Penner et al. | |
| 2015/0324438 | A1* | 11/2015 | Gulezian | G06F 16/283 |
| | | | | 715/202 |
| 2017/0220217 | A1* | 8/2017 | Gilmore | G06F 3/04845 |
| 2018/0095945 | A1* | 4/2018 | Hosabettu | G06F 16/2255 |
| 2018/0129634 | A1* | 5/2018 | Sivaji | G06F 40/103 |

FOREIGN PATENT DOCUMENTS

| | | |
|---|---|---|
| JP | 1998-105732 A | 4/1998 |
| JP | 2001-275083 A | 10/2001 |
| JP | 2002-170364 A | 6/2002 |
| JP | 2003-288068 A | 10/2003 |
| JP | 2004-184576 A | 7/2004 |
| JP | 2006-178945 A | 7/2006 |
| JP | 2008-152459 A | 7/2008 |
| JP | 2008-170637 A | 7/2008 |
| JP | 2014-160437 A | 9/2014 |
| JP | 2016-206916 A | 12/2016 |
| JP | 2018-55270 A | 4/2018 |
| JP | 2019-016409 A | 1/2019 |

OTHER PUBLICATIONS

International Search Report of International Patent Application No. PCT/JP2020/005537 completed Apr. 27, 2020 and dated May 12, 2020 (6 pages).

Written Opinion of International Patent Application No. PCT/JP2020/005537 completed Apr. 27, 2020 and dated May 12, 2020 (4 pages).

Written Opinion of Singapore patent application No. 11202111408U (8 pages).

Written Opinion of Singapore patent application No. 11202111408U dated Jan. 29, 2024 (11 pages).

* cited by examiner

[FIG. 1]
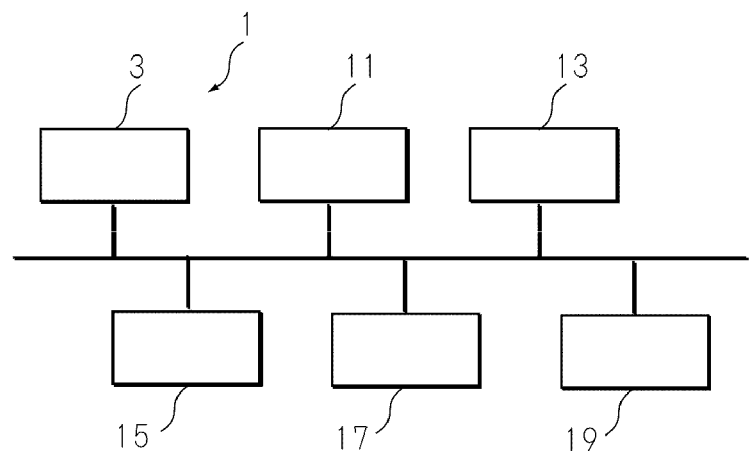
[FIG. 2]
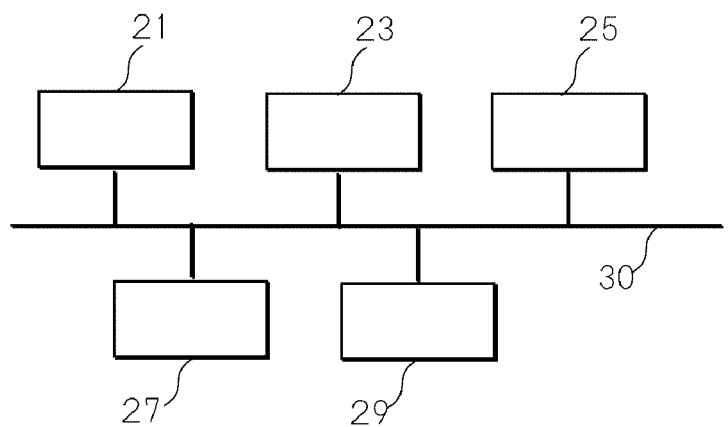

[FIG. 3]
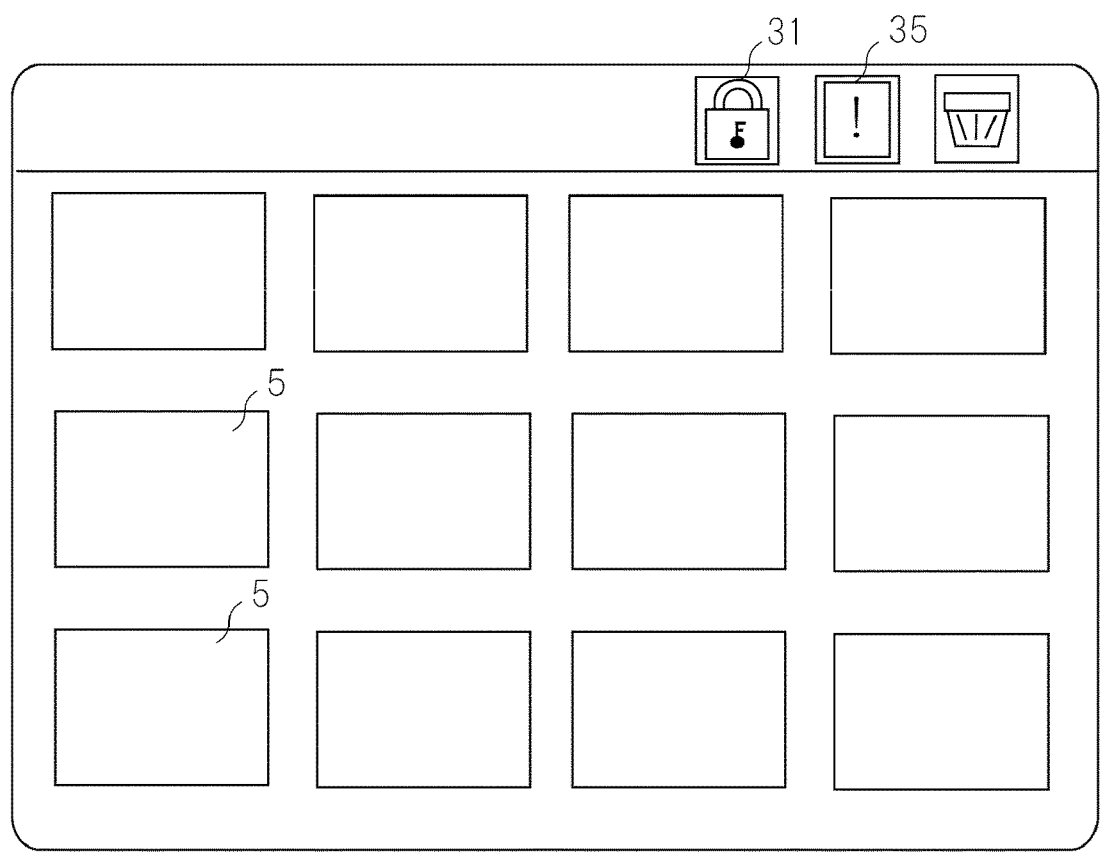

[FIG. 4]
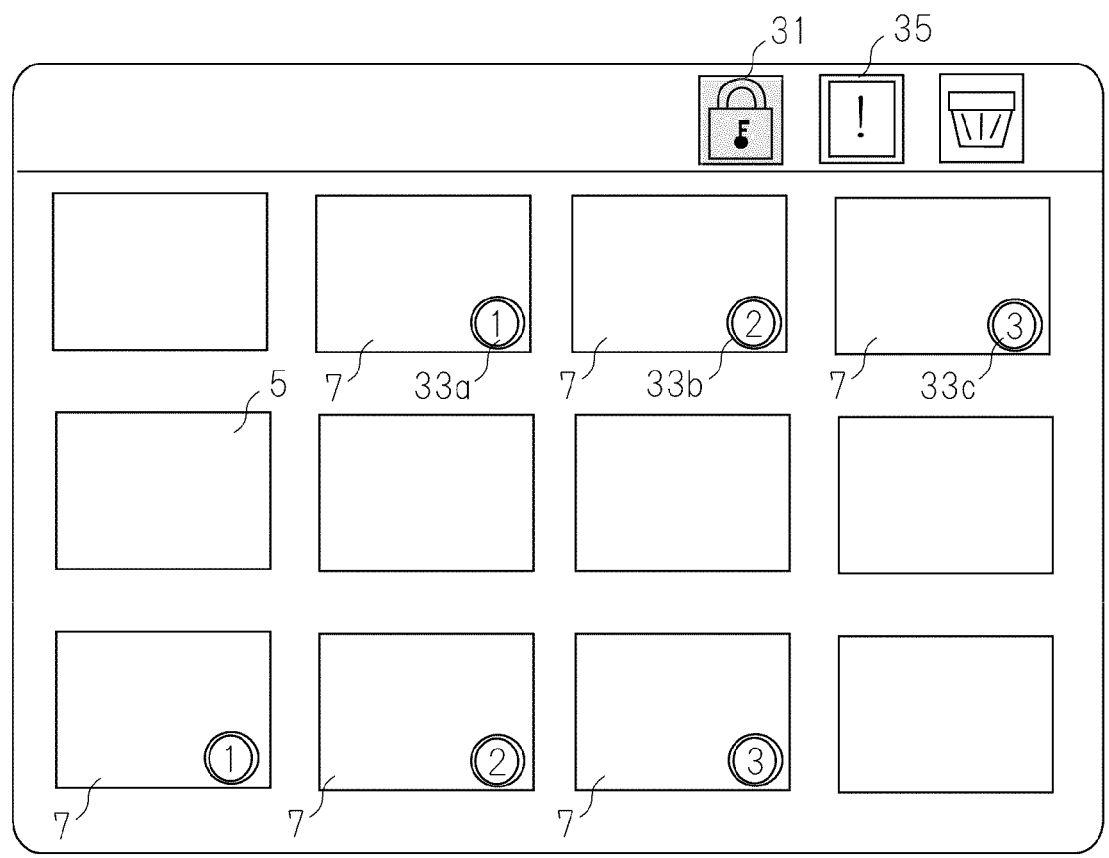

[FIG. 5]
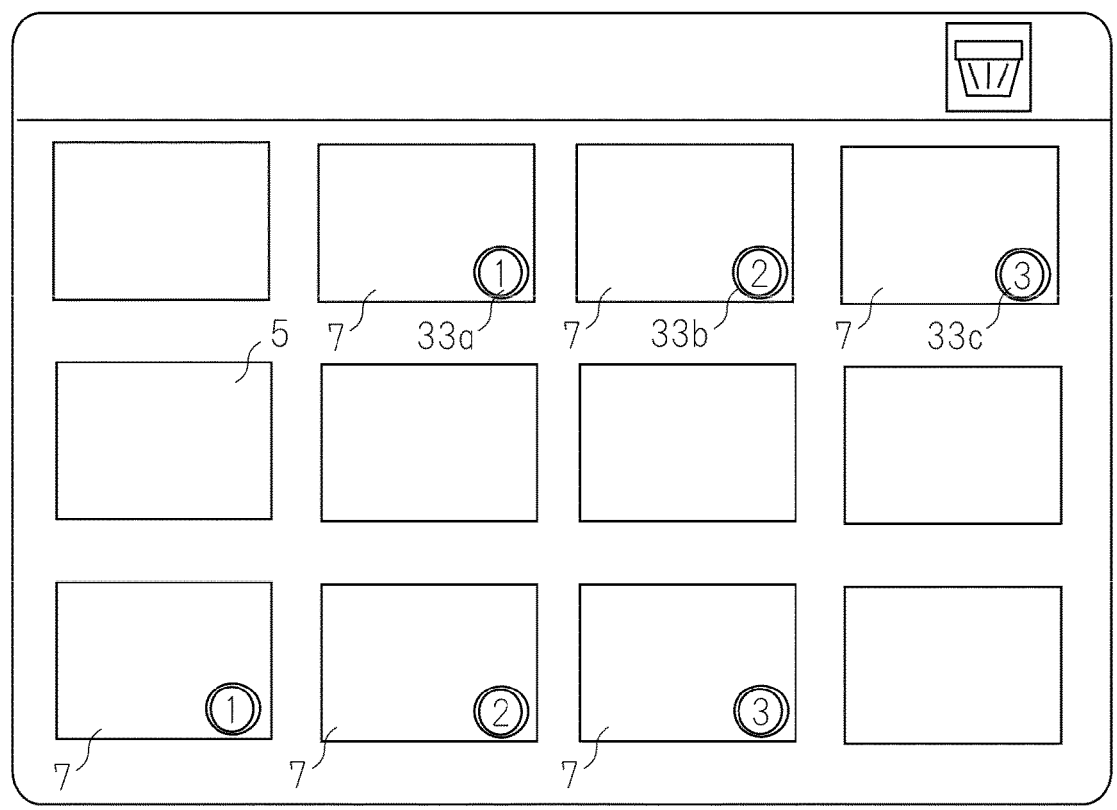

[FIG. 6]
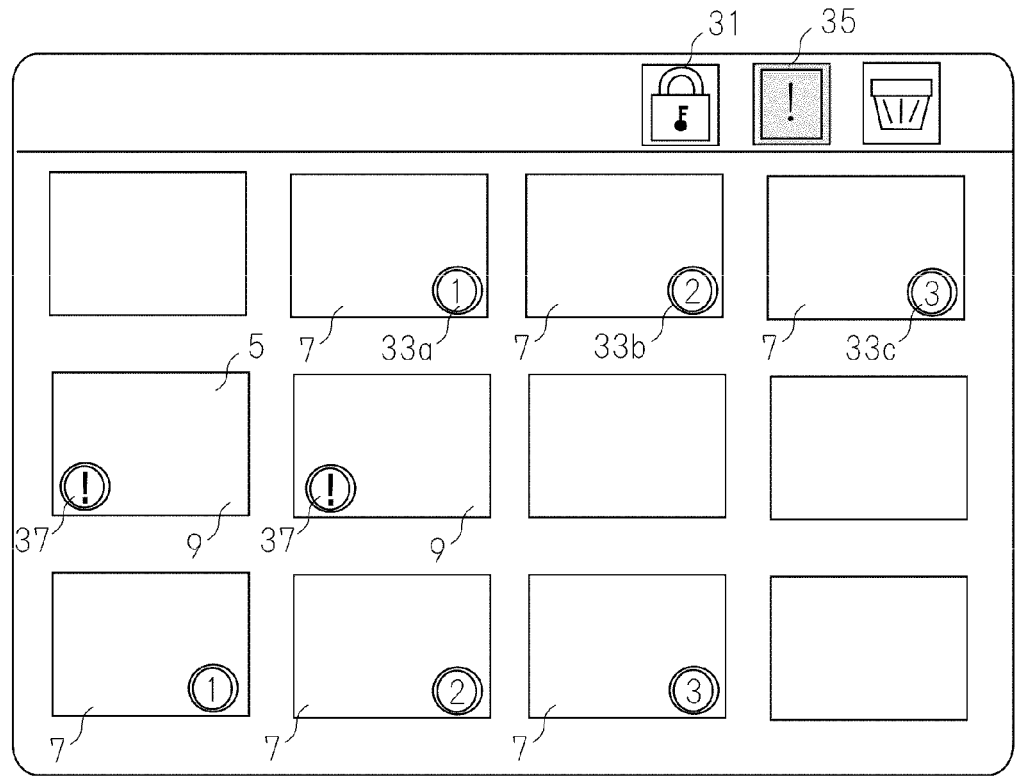
[FIG. 7]
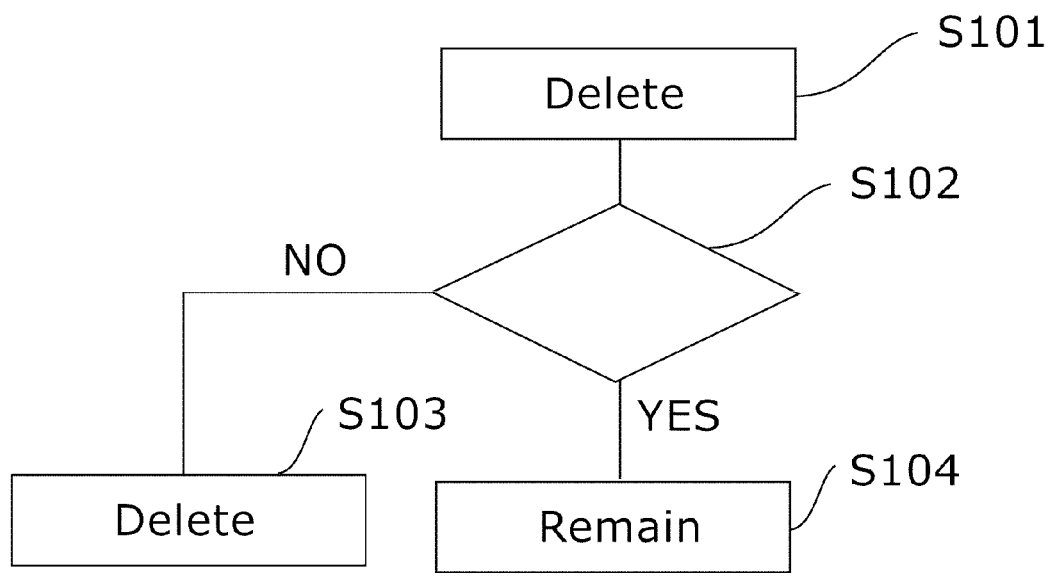

[FIG. 8]
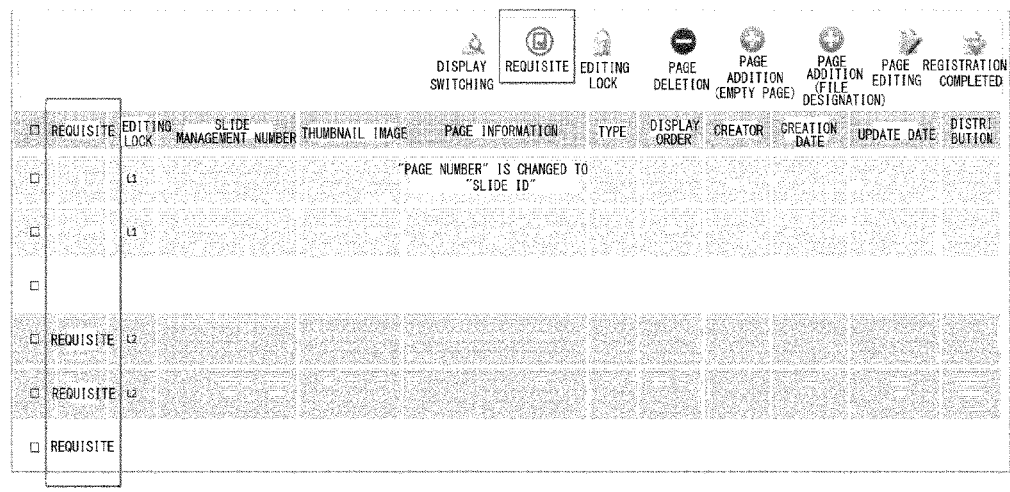
[FIG. 9]
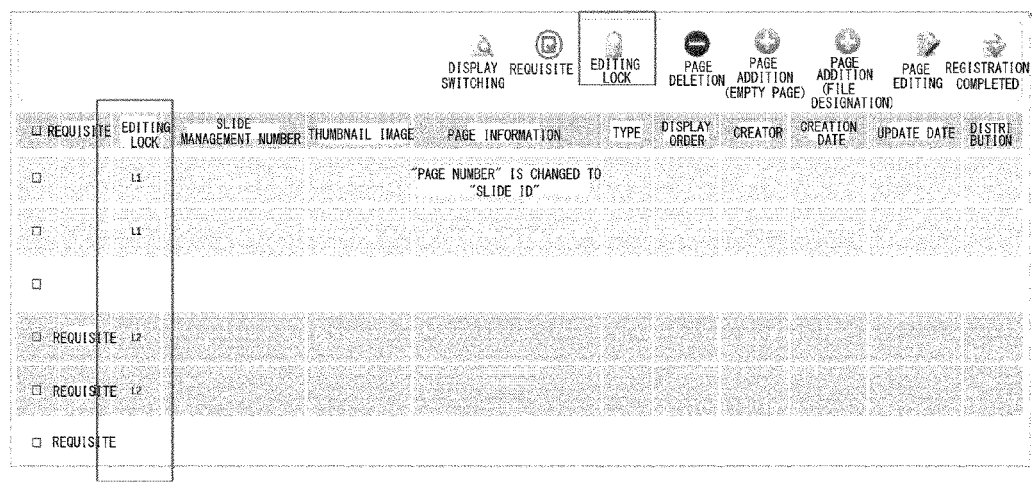

PRESENTATION MANAGEMENT SYSTEM

TECHNICAL FIELD

The present invention relates to presentation management systems. More specifically, this invention relates to computer-aided systems that can set the slide order and requisite slides of presentation materials and prevent them from being edited.

BACKGROUND ART

JP-A-2018-55270 discloses a presentation material generation device that allocates and stores the display order of contents and extracts the contents based on the display order.

CITATION LIST

Patent Literature

PTL 1: JP-A-2018-55270

SUMMARY OF INVENTION

Technical Problem

In the case of sharing presentation materials, even when some slides (pages) are requisite, a user may change the order of them when using or may extract only a part of the slides when using. Thus, a situation in which the explanation differs from the intent of a person who has created the presentation materials, or a situation in which informing requisite matters is failed, may occur.

An invention described in this specification intends to set a slide group in which requisite slides and the order cannot be changed at the time of using some presentation materials. Further, another invention intends to provide a system that can facilitate visually recognizing requisite slides and a slide group at the time of using some presentation materials.

Solution to Problem

The present invention is basically based on the knowledge that, when sharing some presentation materials, enabling to fix the order of a plurality of slides and set requisite slides that must be used when using some presentation materials can prevent misuse of the presentation materials. Further, enabling a user to visually recognize such a display makes it possible to recognize the grouped slides and the requisite slides.

One of the inventions described in this specification relates to a presentation management system 1. The presentation management system 1 is a computer system for managing presentations. This system 1 includes slide storage means 3 and group slide information addition means 11. Each means may be implemented as computer hardware or may be implemented in the form of cooperation of hardware and software.

The slide storage means 3 is an element for storing a plurality of slides relating to presentations. The group slide information addition means 11 is an element for adding group slide information indicating that a display order is fixed in a group of slides 7 to a slide group composed of any two or more of the plurality of slides 5 stored in the slide storage means 3. Further, in this system, the group of slides 7 to which the group slide information is added has the display order that is unchangeable, and slides included in the group of slides are partially undeletable.

This can prevent a situation where a user changes the order of a specific slide group when using, or a situation where only some slides are extracted and used, while maintaining user convenience.

A preferable example of this system further includes slide display means 13 for displaying slide images that are images relating to the plurality of slides 5 on a screen. The images relating to the plurality of slides 5 whose slide images are displayed on the screen may be an assembly of contracted images of respective slides.

Further, a preferable example of this system further includes display order display means 15 for displaying the display order in the group of slides 7, for the slide images relating to respective slides included in the group of slides 7.

Further, a preferable example of this system is such that, even when any content of the plurality of slides 5 is updated, the group slide information is not updated.

Further, a preferable example of this system further includes requisite information addition means 17 for adding requisite information indicating that a slide is requisite to any of the plurality of slides 5 stored in the slide storage means 3. Then, the slide to which the requisite information is added is made undeletable.

Further, a preferable example of this system further includes slide display means 13 for displaying slide images that are images relating to the plurality of slides 5 on a screen, and requisite information display means 19 for displaying requisite information relating to the slide to which the requisite information is added for the slide image relating to the slide to which the requisite information is added.

Another example described in this specification different from the above examples relates to a program that causes a computer to function as the presentation management system 1 that manages presentations. The presentation management system 1 is any of the above-described systems.

Advantageous Effects of Invention

The above-described invention can provide a system capable of setting requisite slides and a slide group in which the order of slides cannot be changed at the time of using some presentation materials. Further, another invention can provide a system that can facilitate visually recognizing requisite slides and a slide group at the time of using some presentation materials.

BRIEF DESCRIPTION OF DRAWINGS

FIG. 1 is a block diagram illustrating an exemplary presentation management system.

FIG. 2 is a block diagram illustrating a basic configuration of a computer.

FIG. 3 is a conceptual diagram illustrating an exemplary slide editing mode screen.

FIG. 4 is a conceptual diagram illustrating an example in which group slide information is added to a group of slides on the slide editing mode screen.

FIG. 5 is a conceptual diagram illustrating an example in which a plurality of slides including a group of slides is selected and displayed on a user's screen.

FIG. 6 is a conceptual diagram illustrating an example in which requisite information is added to some slides on the slide editing mode screen.

FIG. 7 is a flowchart illustrating processing to be performed in response to a user's input operation on a terminal for deleting a slide from presentation materials that include a group of slides or any requisite slide.

FIG. 8 is a conceptual diagram illustrating an exemplary editing screen.

FIG. 9 is a conceptual diagram illustrating an exemplary editing lock.

DESCRIPTION OF EMBODIMENTS

FIG. 1 is a block diagram illustrating an exemplary presentation management system. As illustrated in FIG. 1, this system 1 includes slide storage means 3 and group slide information addition means 11. Each means may be implemented as computer hardware, or may be implemented in the form of cooperation of hardware and software. The presentation management system 1 is a computer system for managing presentations. The presentation management system is a system for managing presentation materials that are stored in the computer or a server and can be used by a plurality of terminals. As illustrated in FIG. 1, this system may include any one of slide display means 13, display order display means 15, requisite information addition means 17, and requisite information display means 19 or an arbitrary combination of two or more of these means.

Further, for example, a computer of an administrator may include the slide storage means 3, the group slide information addition means 11, the slide display means 13, the display order display means 15, the requisite information addition means 17, and the requisite information display means 19. Further, a terminal (computer) of a user may include the slide storage means 3, the slide display means 13, the display order display means 15, and the requisite information display means 19. Examples of user terminals include notebook-type personal computers, PDAs, smartphones, and tablet terminals.

FIG. 2 is a block diagram illustrating a basic configuration of the computer. As illustrated in this drawing, the computer has an input unit 21, an output unit 23, a control unit 25, a calculation unit 27, and a storage unit 29. Respective units are connected via a bus 30 or the like so that reception/transmission of information can be performed. For example, the storage unit may store control programs and also may store various information. In response to predetermined information input from the input unit, the control unit reads a control program stored in the storage unit. Then, the control unit appropriately reads information stored in the storage unit, and transmits the readout information to the calculation unit. Further, the control unit appropriately transmits the input information to the calculation unit. The calculation unit performs arithmetic processing using the received various information, and stores calculation results in the storage unit. The control unit reads calculation results stored in the storage unit, and causes the output unit to output the readout calculation results. As mentioned above, various processing is executed. The one executing various processing is each means.

The slide storage means 3 is an element for storing a plurality of slides relating to presentations. The storage unit of the computer functions as the slide storage means. It is sufficient that the plurality of slides is stored in association with various information such as information relating to contents of each slide (each page), information relating to the name of the entire slide, and information relating to the page of each slide. The plurality of slides can be stored in the slide storage means, for example, by inputting them into the slide storage means from a terminal of a user or administrator.

The group slide information addition means 11 is an element for adding group slide information indicating that a display order is fixed in the group of slides 7 to a slide group composed of any two or more of the plurality of slides 5 stored in the slide storage means 3.

FIG. 3 is a conceptual diagram illustrating an exemplary slide editing mode screen. This slide editing screen includes a group slide icon 31 for adding group slide information. A user or the administrator displays the slide editing mode screen on a display unit of each terminal. Upon selection of the group slide icon 31 on the terminal, the system is brought into a group slide designation mode. In the state of the group slide designation mode, if two or more of the plurality of slides 5 stored in the slide storage means are selected on the terminal within a predetermined period of time, the selected slides are regarded as the group of slides 7. The group slide information indicating the group of slides 7 is stored in the storage unit. In this case, it is desired that this system stores the group slide information in such a manner that it cannot be changed by other users or users other than the administrator.

FIG. 4 is a conceptual diagram illustrating an example in which the group slide information is added to a group of slides on the slide editing mode screen. As illustrated in FIG. 4, for example, denotations 33*a*, 33*b*, and 33*c* are applied to the group of slides 7 so that it is understood that this is a group of slides and the order in the group of slides can be understood. In order to realize this display, each slide included in the group of slides stored in the slide storage means is added group slide information indicating that it relates to a specific group slide or relates to the order in this group slide. The computer manages the group of slides 7 to which the group slide information is added so that they are in a state where other users cannot change the display order and cannot delete only partial slides included in the group of slides. Since users may use original presentation materials to customize them for their own presentations, there are cases in which the users may remove some slides that are considered to be unnecessary so that they are not displayed. Deleting the slides is, for example, removing some slides from presentation materials containing a plurality of slides originally provided.

This can prevent a situation where a user changes the order in a specific slide group when using, or a situation where only a part of the slides is extracted when using, while maintaining user convenience.

A preferable example of this system further includes the slide display means 13 for displaying slide images that are images relating to the plurality of slides 5 on the screen. The slide display means 13 is configured to create deformation images using respective contents of the plurality of slides 5 stored in the slide storage means 3. This may be a so-called thumbnail technique. For example, regarding photographic information included in each slide, it is sufficient that contraction to a predetermined contraction size is feasible while the photographic resolution is lowered. For example, characters whose character size is equal to or less than a predetermined value may be deleted. Further, regarding characters whose character size is equal to or larger than the predetermined value, it is sufficient that they are displayed on the display unit as contracted ones whose sizes are obtained by multiplying a predetermined magnification. In this manner, deformation images of respective slides can be obtained. Then, enabling the obtained deformation images to be displayed on a plurality of screens can realize thumbnail display. As mentioned above, the images whose slide images relate to the plurality of slides 5 to be displayed on the screen may be an assembly of images obtained through contraction of respective slides.

FIG. 5 is a conceptual diagram illustrating an example in which a plurality of slides including a group of slides is selected and displayed on a user's screen. A preferable example of this system further includes the display order display means 15 for displaying the display order in the group of slides 7, for the slide images relating to respective slides included in the group of slides 7. For example, a user selects some presentation materials stored in a server. Then, each slide included in the presentation materials is read out from the slide storage means 3 and displayed on the screen of a user's terminal. In the slide storage means 3 of the server, the group slide information is added to the group of slides 7 and stored. Therefore, when the user's terminal reads the presentation materials from the slide storage means 3 of the server, the group slide information is read out together. Then, the user's terminal performs display relating to the readout group slide information. An example of this display is the one illustrated in FIG. 5. In the example of FIG. 5, thumbnail images of the group of slides 7 are given the denotations 33a, 33b, and 33c relating to the group slide. This can be attained by the computer. At the time of reading the presentation materials from the storage unit, the computer reads not only slide information but also group slide information. Then, at the time of performing the thumbnail display of respective slides included in the presentation materials, the computer performs display relating to the group slide for the corresponding group of slides based on the readout group slide information.

A preferable example of this system is such that, even when any content of the plurality of slides 5 is updated, the group slide information is not updated. For example, let's suppose that a user or administrator has revised a slide included in some presentation materials. In this case, the content of the revised slide is updated. However, the group of slides 7 and the group slide information included in the presentation materials are not changed. In other words, the group of slides 7 included in the presentation materials is not affected by any change occurring in other slides. In short, even when the content included in some presentation materials has been changed, the group slide information is updated without any change.

Further, a preferable example of this system further includes the requisite information addition means 17 for adding requisite information indicating that a slide is requisite to any of the plurality of slides 5 stored in the slide storage means 3. Then, the slide to which the requisite information is added is made undeletable.

In the example of FIG. 3, the slide editing screen includes a requisite information icon 35 for adding the requisite information. A user or administrator operates each terminal to display the slide editing mode screen on display unit. Then, when the requisite information icon 35 is selected on the terminal, the system is brought into a requisite slide designation mode. In the state of the requisite slide designation mode, if a slide 5 stored in the slide storage means is selected on the terminal, the selected slide is regarded as a requisite slide (a slide to which the requisite information is added). In this case, in connection with to the slide (requisite slide) stored in the slide storage means 3, the requisite information is added and stored.

FIG. 6 is a conceptual diagram illustrating an example in which the requisite information is added to some slides on the slide editing mode screen. As illustrated in FIG. 6, requisite slides 9 are accompanied with denotations 37, for example, so that they can be identified as requisite slides. In order to realize this display, the requisite information is added to the requisite slide stored in the slide storage means. The requisite slide 9 to which the requisite information is added is managed by the computer in such a way as to be brought into a state where the requisite slide cannot be deleted by other users.

Further, a preferable example of this system further includes the slide display means 13 for displaying the slide images that are images relating to the plurality of slides 5 on the screen, and the requisite information display means 19 for displaying the requisite information relating to the slide to which the requisite information is added for the slide image relating to the slide to which the requisite information is added.

For example, a user selects some presentation materials stored in the server. Then, each slide included in the presentation materials is read out from the slide storage means 3 and displayed on the screen of the user's terminal. In the slide storage means 3 of the server, the requisite information is added to the requisite slide 9 and stored. Therefore, when the user's terminal reads the presentation materials from the slide storage means 3 of the server, the requisite information is read out together. Then, the user's terminal performs display relating to the readout requisite information. For example, a thumbnail image of the requisite slide 9 is given the denotation 35 relating to the requisite slide. This can be attained by the computer. At the time of reading the presentation materials from the storage unit, the computer reads not only the slide information but also the requisite information. Then, at the time of performing the thumbnail display of respective slides included in the presentation materials, the computer performs display relating to the requisite slide for the corresponding requisite slide based on the readout requisite information.

Depending on each system, a group of slides may be automatically stored and managed as requisite slides. FIG. 7 is a flowchart illustrating processing to be performed in such a case. In this case, an instruction for deleting any of a group of slides is input on the user's terminal (S101). In response to this input, the computer determines whether the slide for which the deletion instruction has been input is a requisite slide or a group of slides, by using ID of the slide input together with the deletion instruction (S102). Then, if the computer determines that the slide whose deletion is instructed is neither a requisite slide nor a group of slides, then the deletion instructed slide is deleted (S103). In this processing, for example, it is sufficient that the computer determines, with reference to ID of the deletion instructed slide, whether the requisite information or the group slide information 9 is recorded in the storage unit, in relation to the slide having this ID. On the other hand, if the computer determines that the slide whose deletion is instructed is a requisite slide or a group of slides, then this slide is not deleted (S104). As mentioned above, a situation where a group of slides or a requisite slide is deleted in the case of using some presentation materials can be prevented.

Using this system enables a user or administrator who has created a presentation to set a requisite slide, or set a group of slides, for presentation materials. Further, even when a user downloads some presentation materials from, for example, a server and uses the downloaded materials on a personal terminal, using this computer or using another computer on which the above-described program is installed can prevent a situation where a group of slides or a requisite slide is deleted in the case of using some presentation materials.

Another example in this specification, which is different from the above-described examples, relates to a program that causes a computer to function as the presentation management system 1 for managing presentations. The presentation management system 1 may be any of the above-described systems, and an example of the presentation management system 1 managing presentations includes the slide storage means 3 for storing a plurality of slides relating to presentations and the group slide information addition means 11 for adding group slide information indicating that the group of slides 7 is fixed in display order to a slide group composed of any two or more of the plurality of slides 5 stored in the slide storage means 3. In this system, the group of slides 7 to which the group slide information is added has the display order that is unchangeable, and slides included in the group of slides are partially undeletable.

This specification also provides a computer-readable information recording medium that stores the above-described program. Examples of the information recording medium include CDs, CD-ROMs, DVDs, SD cards, memory chips, USB memories, and hard disks.

Embodiment 1

A pharmaceutical company often distributes presentation materials created with PowerPoint (registered trademark) to staffs so that the staffs can freely rearrange pages (slides) for presentations. For example, a staff may delete some unnecessary slides from the presentation materials, considering explanation time and opponents who are given the explanation, when giving a presentation. In recent years, strict and correct promotions have been required. To this end, it is desired to (1) prevent each content from being deleted when the deletion may change the meaning, or (2) prevent the order of a slide from being rearranged when the rearrangement may change the meaning.

Therefore, a program for implementing the following functions has been introduced on computer terminals of staffs.

Requisite Slide Function

This is a function for enabling a content administrator to perform setting, for example, for a file composed of 20 pages (presentation materials), such that the presentation materials must include designated pages (e.g., 2nd, 3rd, and 8th to 12th pages) that staffs must use as long as this file is used.

This is a function for preventing staffs from performing non-display setting for requisite slides or deleting the requisite slides when using the presentation materials.

It is desired that an administrator such as the content administrator (or a server staff) can add or delete this function.

Editing Lock Function

This is a function for enabling the content administrator to perform setting, for example, for a file composed of 20 pages (presentation materials), such that rearranging predetermined slides (e.g., 13th to 15th pages) is unable, as long as this file is used.

In this case, for example, a terminal of a user or staff is set to be unable to change the order of this fixed slide and also unable to delete only a part of the slides.

In order to manage the requisite slide function and the editing lock function described above, for example, for each slide (or each page) of presentation materials, it is sufficient that attribute information thereof can be set and revised for each slide (page).

FIG. 8 is a conceptual diagram illustrating an exemplary editing screen. In the example of FIG. 8, it is possible to input an attribute indicating whether it is requisite or not about each page of presentation materials. Further, each page for which the attribute indicating requisiteness has been input is regarded as a requisite slide. Then, a user's terminal is brought into a state where no requisite slide can be deleted from the presentation materials.

FIG. 9 is a conceptual diagram illustrating an exemplary editing lock. The editing lock corresponds to a group slide mode. In the example of FIG. 9, two group slides of L1 group (1st page and 2nd page) and L2 group (4th page and 5th page) are designated and locked so that they cannot be edited.

INDUSTRIAL APPLICABILITY

The present invention relates to presentation management systems and the like and therefore can be used in the information industry.

REFERENCE SIGNS LIST

1 Presentation management system
3 Slide storage means
5 Slide
7 Group of slides
11 Slide information addition means
13 Slide display means
15 Display order display means
17 Requisite information addition means
19 Requisite information display means

The invention claimed is:

1. A presentation management system for managing presentations, comprising:
   a slide storage which stores a plurality of slides that relate to presentations; and
   a group slide manager which adds group slide information indicating that a display order is fixed in a group of slides to a slide group composed of any two or more of the plurality of slides stored in the slide storage,
   wherein the slide storage further stores conditions that:
     the group of slides to which the group slide information is added has the display order that is unchangeable by other users' terminals that are not a terminal which adds the group slide information,
     slides included in the group of slides are partially undeletable by the other users' terminals,
     the other users' terminals can change display order of slides except for the slides in the group of slides to which the group slide information is added and can delete slides except for the slides in the group of slides to which the group slide information is added, and
     the terminal which adds the group slide information can change order of the slides in the group of slides to which the group slide information is added and can partially delete the slides in the group of slides to which the group slide information is added,
   a display manager of slide for displaying slide images that are images relating to the plurality of slides on a screen; and
   a display manager of order for displaying the display order in the group of slides, for slide images relating to respective slides included in the group of slides,
   wherein the presentation management system further comprises a display manager of a group slide icon, the group slide icon being used for adding group slide information to the plurality of slides, wherein when the group slide icon is selected the system turns to be a state of group slide designation mode, and wherein the slide images relating to respective slides included in the group of slides include numbers that show unchangeable order, the unchangeable order being the display order that is unchangeable by the other users' terminals.

2. The system according to claim 1, wherein even when any content of the plurality of slides is updated, the group slide information is not updated.

3. The system according to claim 1, further comprising:

a requisite slide manager for adding requisite information indicating that a slide is requisite to any of the plurality of slides stored in the slide storage, wherein the slide to which the requisite information is added is made undeletable.

4. The system according to claim 3, further comprising:

a display manager of requisition for displaying requisite information relating to the slide to which the requisite information is added for the slide image relating to the slide to which the requisite information is added.

5. The system according to claim 1, wherein each of the numbers that show unchangeable order is at the under right area of each of the group slides.

6. The system according to claim 1, wherein each of the numbers that show unchangeable order is in a circle at under right area of each of the group slides.

7. A non-transitory computer readable media that contains a program, the program is a presentation management system that manages presentations, wherein the presentation management system includes:

slide storage for storing a presentation material which comprises a plurality of slides relating to a presentation; and group slide manager for adding group slide information indicating that a display order is fixed in a group of slides to a slide group composed of any two or more of the plurality of slides stored in the slide storage, wherein the slide group does not comprise all of the slides relating to the presentation, and wherein the slide storage further stores conditions that:

the group of slides to which the group slide information is added has the display order that is unchangeable by other users' terminals that are not a terminal which adds the group slide information, slides included in the group of slides are partially undeletable by the other users' terminals, the other users' terminals can change display order of slides except for the slides in the group of slides to which the group slide information is added and can delete slides except for the slides in the group of slides to which the group slide information is added, and the terminal which adds the group slide information can change order of the slides in the group of slides to which the group slide information is added and can partially delete the slides in the group of slides to which the group slide information is added, a display manager of slide for displaying slide images that are images relating to the plurality of slides on a screen; and a display manager of order for displaying the display order in the group of slides, for slide images relating to respective slides included in the group of slides;

wherein the presentation management system further comprises a display manager of a group slide icon, the group slide icon being used for adding group slide information to the plurality of slides, wherein when the group slide icon is selected the system turns to be a state of group slide designation mode; and wherein the slide images relating to respective slides included in the group of slides include numbers that show unchangeable order, the unchangeably order being the display order that is unchangeable by the other users' terminals.

* * * * *